REELED ARTICLES STORAGE AND CARRYING CASE

Filed Aug. 24, 1960 2 Sheets-Sheet 1

INVENTOR.
JACOB M. GOLDBERG
BY
ATTORNEYS

REELED ARTICLES STORAGE AND CARRYING CASE

Filed Aug. 24, 1960 2 Sheets-Sheet 2

INVENTOR.

JACOB M. GOLDBERG

BY

Anderson, Spangler & Gilmore

ATTORNEYS 3,007,758
Patented Nov. 7, 1961

3,007,758

REELED ARTICLES STORAGE AND CARRYING CASE

Jacob M. Goldberg, Denver, Colo., assignor to Goldberg Brothers, Inc., Denver, Colo., a corporation of Colorado Filed Aug. 24, 1960, Ser. No. 51,684
1 Claim. (Cl. 312—20)

This invention relates to a novel and improved combination storage and carrying case for reeled articles.

Amateur movie-makers and persons who collect tape recordings frequently build up substantial libraries of reels which become quite a problem to catalog and store to say nothing of the difficulties encountered in protecting them from damage while being carried from place to place. Both motion picture films and magnetic tapes are adversely affected by moisture, abrasion, excessive heat and sunlight whereas the carboard cartons in which these items are usually packaged by the manufacturers afford inadequate protection against damage resulting from one or more of the aforementioned conditions. Other makeshift containers for movie films especially are required once the film has been edited and spliced because it is usually made up into reels several hundred feet long which, of course, far exceeds the capacities of both the reels and boxes supplied for this purpose by the manufacturer; yet, if film-changing in the projector every few minutes is to be eliminated, larger reels must be used.

Damage to these delicate items most often occur, however, due to rough handling while searching for a specific reel or during the act of carrying a stack of reels from the place where they were stored to the site of use. Scratches, wrinkles and breaks occurring in this manner can never be repaired well enough to place the tape or film in its original condition; therefore, a convenient portable storage and carrying case that would protect reeled articles against the aforementioned hazards would fill a long-felt need of the hobbyist and professional alike.

Accordingly, it is the principal object of the present invention to provide a novel portable storage case of a type ideally suited for use as a container for reeled articles such as movie film, magnetic tape and similar items.

A second objective is the provision of a case of the class described which is substantially moisture and mildew-proof, at least to the extent required to preserve films and tapes against damage therefrom while preventing excessive drying which is equally as detrimental.

Another objective of the reel holder of the instant invention is to provide a convenient and effective means for cataloging the contents.

Still another object is to provide a device for storing and carrying reels that includes a hinged tray adapted to automatically deliver the entire assortment to the convenient access of the user for selection as soon as the door thereto is opened, yet which maintains the remaining reels securely held therein.

An additional objective is the provision of a reeled article holder that maintains the reels in an upright spaced relation to one another by means of dividers such that stacking is eliminated along with the possibility of damaging those on the bottom due to excessive weight carried thereby.

Further objects are to provide a container of the type aforementioned which is rugged, lightweight, compact, versatile, crush-proof under normal loading conditions, stackable and decorative in appearance.

Other objectives will be in part apparent and in part pointed out specifically hereinafter in connection with the description of the drawings that follows, and in which.

Figures 1, 2:
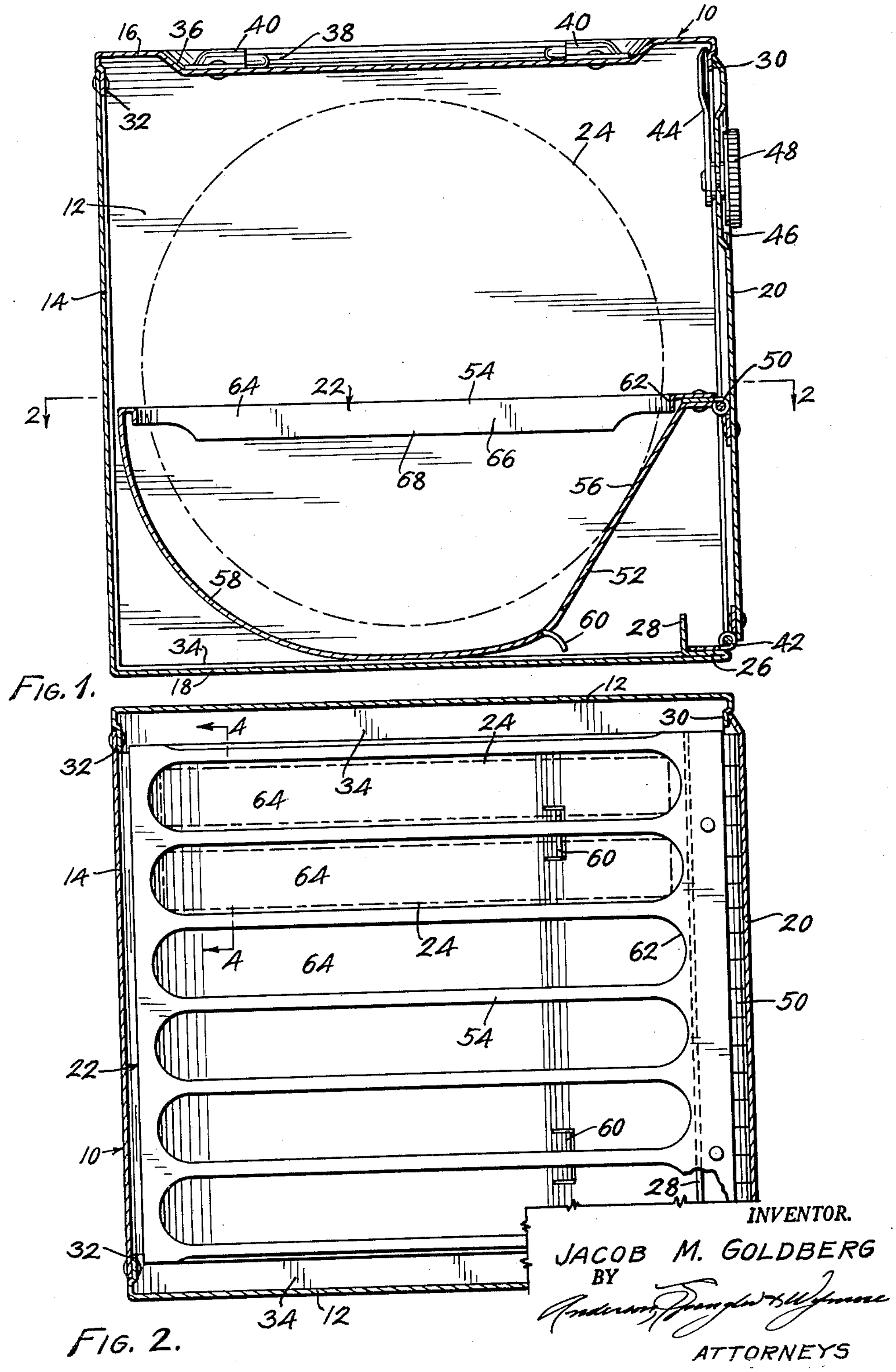
FIGURE 1 is a vertical section taken from front to rear showing the case for reeled articles of the present invention.
FIGURE 2 is a horizontal section thereof taken along line 2—2 of FIGURE 1.
Figures 3, 4:
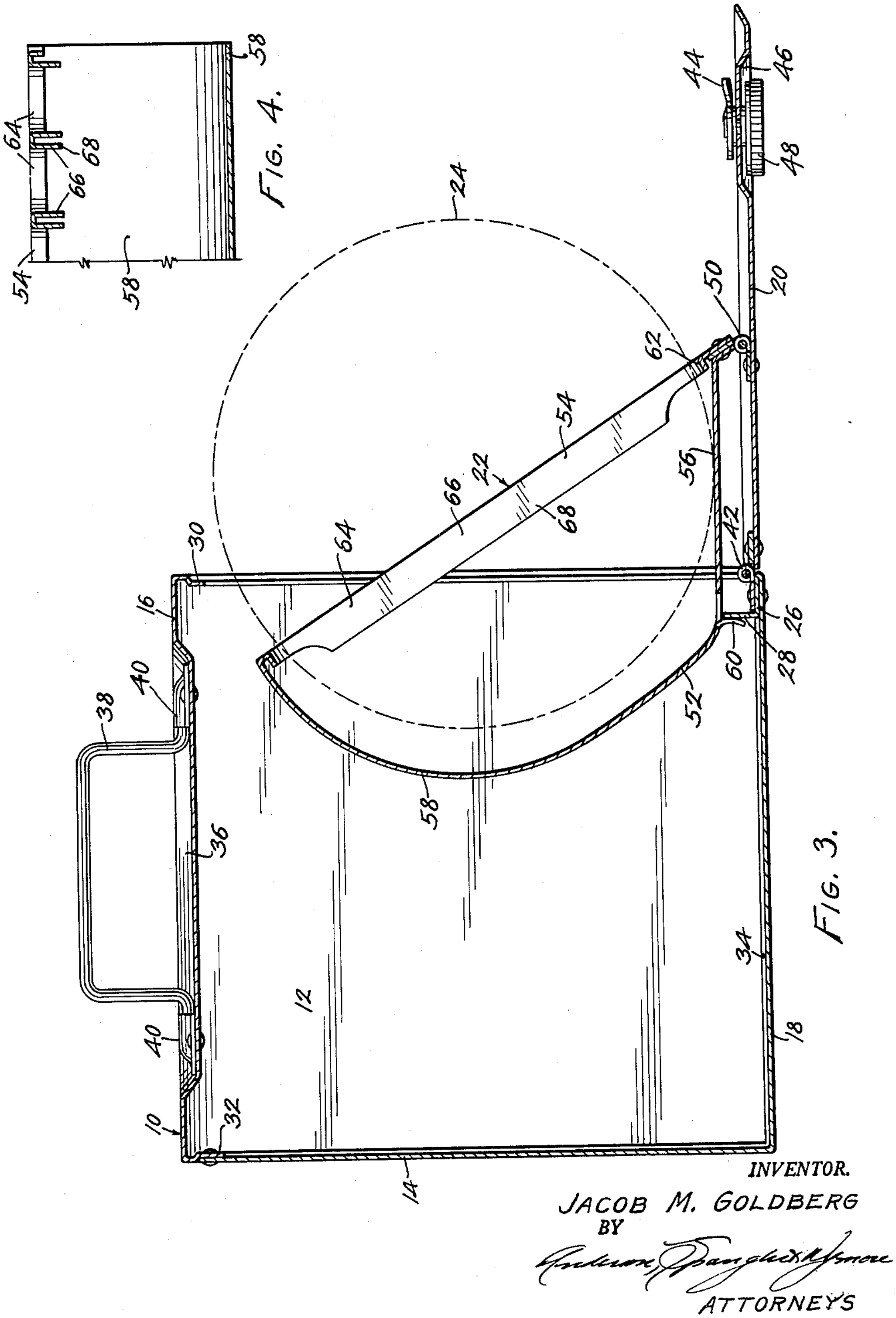
FIGURE 3 is a vertical section similar to FIGURE 1 except that the door is shown in open position with the reel tray extended; and, FIGURE 4 is a fragmentary sectional detail taken along line 4—4 of FIGURE 2 showing the tray dividers that function to maintain the reels in side-by-side spaced relation.

Referring now to the drawings for a detailed description of the container for reeled articles of the present invention, and in particular to the first three figures for this purpose, it will be seen to include a body indicated in a general way by numeral 10 having generally square sidewalls 12, rear wall 14, top wall 16, bottom wall 18 and front wall 20 hinged along its lower edge to form a door that opens outwardly and cooperates with the rack assembly indicated broadly by numeral 22 to draw the reeled articles 24 forwardly through the opening thus provided. The body 10 thus has a generally hollow cube shape with a front opening door although, of course, the overall length, height and depth of the container may vary within wide limits depending upon the diameter and number of reels the unit is designed to accommodate. As will be seen in FIGURES 1 and 3, the rear wall 14 and bottom wall 18 are formed as a unit with the front margin of the bottom wall folded back upon itself as at 26 and then upturned to provide a transverse stop 28, the purpose of which will be set forth in detail presently. Similarly, the top wall 16 and side walls 12 are fabricated from a single rectangular sheet of metal and are bent to provide inturned flanges along the front, rear and end margins 30, 32 and 34, respectively, that are offset the thickness of the adjacent rear or bottom wall to which they are riveted or otherwise attached thus providing a smooth substantially planar exterior surface. Top wall 16 includes a centrally-located recess 36 adapted to receive a foldable handle 38 in flush relation, the latter being mounted within a pair of opposed handle-mounting brackets 40 which are riveted to the top within the depression.

One leaf of a piano-type hinge 42 is attached along the lower edge of the door 20 while the other leaf thereof is secured to the folded or reversely bent portion 26 of the bottom wall 18 ahead of the stop 28. The door 20 is, therefore, movable between the closed position of FIGURE 1 and the open position of FIGURE 3. Front flange 32 along the top and side walls engages the door 20 providing a stop therefor in closed position. A rotatable latch 44 is located within a suitable recess 46 positioned near the top edge of the door 20 and functions to lock behind the front flange 32 in closed position as shown most clearly in FIGURE 1. A knob 48 is attached to the latch and is accessible on the front of the door within the recess 46.

Perhaps the single most significant feature of the container for reeled articles of the present invention is the rack assembly 22 which cooperates with the door to deliver the contents to the user when opened. This unique assemblage can best be described by referring to all the figures of the drawing to which reference will now be had. Approximately one-third the way up the door 20, one leaf of a second piano-type hinge 50 is attached on the inside surface thereof while the other leaf is secured to the front margins of both a tray 52 and divider 54 that make up the rack assembly 22. The tray element 52 of the assembly includes a substantially planar portion 56 that slopes downwardly and rearwardly from hinge 50 to a point spaced slightly above the bottom 18 when the door is closed as in FIGURES 1 and 2 while occupying a position in spaced substantially parallel relation to the door when in the fully open position of FIGURE 3. The remainder of the tray unit 52 comprises a generally arcuate portion 58 that curves along the bottom and up the rear wall to the point where it joins the divider 54 substantially opposite hinge 50. Thus, the tray provides a cradle adapted to receive disk-shape reeled articles such as have been designated by dot-dash lines and identified by reference numeral 24.

Before proceeding with a description of the divider 54 of the rack assembly, one remaining important feature of the tray unit 52 should be described. Note that the tray includes a pair of downturned tabs 60 located at approximately the juncture between the planar and arcuate portions of the tray. Specifically, these tabs are designed and arranged to contact stop 28 projecting upwardly from the bottom 18 when the tray slides forwardly as the door 20 opens. In other words, by examining FIGURE 3, it will become apparent that as the door swings open and the rack assembly slides forwardly along the bottom, the reeled articles 24 move into a position where they are supported by the door ahead of hinge 42 and they could easily roll out onto the floor if it were not for the fact that the divider 54 presents a lip 62 along its front edge adapted to keep them in place and the fact that tabs 60 engage the stop 28 preventing the door from swinging below a substantially horizontal position. As it is, however, the tray assembly and door cooperate with one another to deliver the reeled articles through the open front of the body while maintaining them in a position that prevents their rolling out onto the ground as long as the container is held in a relatively level position. Also, from an examination of FIGURE 1, it should be apparent that it would be difficult if not impossible to load the rack unless means such as that described herein were provided for tilting it forwardly into a position where it became accessible through the open front.

Finally, it will be seen that the divider unit 54 of the tray assembly comprises merely a sheet of metal stamped to provide a plurality of elongate slots 64 arranged in side-by-side parallel relation and separated from one another by generally channel-shaped webs 66 utilizing the metal formerly occupying the slots. Actually, both the tray unit and divider of the rack assembly are preferably fabricated integral with one another from a single sheet of metal as shown most clearly in FIGURES 1 and 3. The downturned flanges 68 bordering the webs 66 prevent scratching the reeled articles stored therein, strengthen the unit, and in the case of those along the front edge, provide a portion of the lip 62 that holds the reels in place when the door is open.

Having thus described the several useful and novel features of the container for reeled articles of the present invention, it will be apparent that the many worthwhile objectives for which it was designed have been achieved. Although but a single specific embodiment of the invention has been illustrated and described in connection with the accompanying drawings, I realize that certain changes and modifications therein may well occur to those skilled in the art within the broad teaching found herein; hence, it is my intention that the scope of protection afforded hereby shall be limited only insofar as said limitations are expressly set forth in the appended claim.

What is claimed is:

A container for reeled articles and the like which comprises, a box-like body having side walls, top and bottom walls, a rear wall and a front wall hingedly attached to the front edge of the bottom wall forming a door movable between open and closed positions, and a rack assembly located within the lower half of the body adapted to receive a plurality of reeled articles in side-by-side spaced relationship which includes a tray resting on the bottom with a portion extending upwardly therefrom toward the door and a divider having a plurality of elongated parallel slots extending from front to rear covering the tray, said rack assembly being hingedly connected to the door intermediate the upper and lower edges thereof for relative tiltable movement, said rack assembly and door cooperating with one another upon movement of the latter from closed to open position to deliver any reeled articles resting on the tray within the slots through the open front of the body by sliding said tray forwardly along the bottom while tiling the entire rack assembly downwardly as well as forwardly wherein the rack assembly and body are provided with cooperating stops engageable with one another to limit the movement of the door in open position to that in which it occupies a substantially coplanar relation to the bottom and the cooperating stops comprise a transversely extending upturned flange adjacent the front edge of the bottom and at least one downturned tab on the tray positioned to engage said flange upon tiltable movement of the rack assembly and slidable movement thereof forwardly.

References Cited in the file of this patent

UNITED STATES PATENTS

| | | |
|---|---|---|
| 1,262,789 | Heller | Apr. 16, 1918 |
| 1,395,188 | Kesslering | Oct. 25, 1921 |
| 1,525,890 | Salmon | Feb. 10, 1925 |
| 1,737,156 | Hodgkins | Nov. 26, 1929 |
| 2,354,872 | Mitnick | Aug. 1, 1944 |